(12) United States Patent
Louveau

(10) Patent No.: US 10,118,289 B2
(45) Date of Patent: Nov. 6, 2018

(54) MOTOR DRIVEN ARTICULATED ARM WITH CABLE CAPSTAN INCLUDING A BRAKE

(71) Applicant: HAPTION, Soulge-sur-Ouette (FR)

(72) Inventor: Francois Louveau, Villiers-Charlemagne (FR)

(73) Assignee: HAPTION, Soulge-sur-Ouette (FR)

( * ) Notice: Subject to any disclaimer, the term of this patent is extended or adjusted under 35 U.S.C. 154(b) by 0 days.

(21) Appl. No.: 15/193,948

(22) Filed: Jun. 27, 2016

(65) Prior Publication Data
US 2016/0375577 A1    Dec. 29, 2016

(30) Foreign Application Priority Data

Jun. 26, 2015    (FR) ...................................... 15 56001

(51) Int. Cl.
*G05B 15/00*      (2006.01)
*G05B 19/00*      (2006.01)
(Continued)

(52) U.S. Cl.
CPC ............... *B25J 3/04* (2013.01); *B25J 13/025* (2013.01); *B25J 18/00* (2013.01); *B25J 19/0004* (2013.01)

(58) Field of Classification Search
CPC ... B25J 3/04; B25J 13/025; B25J 18/00; B25J 19/0004
See application file for complete search history.

(56) References Cited

U.S. PATENT DOCUMENTS

| 5,046,375 A | 9/1991 | Salisbury, Jr. et al. |
| 5,207,114 A * | 5/1993 | Salisbury, Jr. ........... B25J 9/046 414/7 |

(Continued)

FOREIGN PATENT DOCUMENTS

| FR | 2950831 A1 | 4/2011 |
| WO | 2011157757 A1 | 12/2011 |

OTHER PUBLICATIONS

French Search Report and Written Opinion dated Apr. 13, 2016 for corresponding French Application No. 1556001, filed Jun. 26, 2015.
(Continued)

*Primary Examiner* — Rachid Bendidi
(74) *Attorney, Agent, or Firm* — David D. Brush; Westman, Champlin & Koehler, P.A.

(57) ABSTRACT

A motor-driven articulated haptic interface arm includes a frame; an arm linked to the frame and rotationally mobile about an axis; and a motor including a rotor, which delivers at least one maximum resistant torque about the axis opposing at least part of forces applied to the arm by its environment. A main transmission transmits to the arm the resistant torque about the axis and includes a capstan-type cable reducer. The arm includes elements for evaluating the resistant torque transmitted to the arm by the motor; braking rotation of the arm about the axis; activating the brake when the maximum resistant torque is reached by the motor; evaluating, after activation of the brake, the forces transmitted to the arm by the environment, including determining a deformation of the transmission under the forces; and deactivating the brake when the deformation goes below a predetermined threshold value.

17 Claims, 5 Drawing Sheets

(51) Int. Cl.
*B25J 3/04* (2006.01)
*B25J 13/02* (2006.01)
*B25J 19/00* (2006.01)
*B25J 18/00* (2006.01)

(56) References Cited

U.S. PATENT DOCUMENTS

| | | | |
|---|---|---|---|
| 2009/0228145 A1* | 9/2009 | Hodgson | A61B 17/1757 700/258 |
| 2012/0192671 A1* | 8/2012 | Riwan | B25J 19/0004 74/490.03 |
| 2013/0090194 A1* | 4/2013 | Ferlay | B25J 9/104 474/64 |
| 2014/0026705 A1* | 1/2014 | Sasaki | B25J 9/106 74/490.05 |

OTHER PUBLICATIONS

English translation of the French Written Opinion dated Apr. 13, 2016 for corresponding French Application No. 1556001, filed Jun. 26, 2015.
Kwon T B et al: "Force display using a hybrid haptic device composed of motors and brakes", Mechatronics, Pergamon Press, Oxford, GB, vol. 16, No. 5, Jun. 1, 2006 (Jun. 1, 2006), pp. 249-257, XP024961899.
Rossa Carlos et al: "Design and Control of a Dual Unidirectional Brake Hybrid Actuation System for Haptic Devices", IEEE Transactions on Haptics, IEEE, USA, vol. 7, No. 4, Oct. 1, 2014 (Oct. 1, 2014), pp. 442-453, XP011568389.

* cited by examiner

MOTOR DRIVEN ARTICULATED ARM WITH CABLE CAPSTAN INCLUDING A BRAKE

1. FIELD OF THE INVENTION

The field of the invention is that of haptic interfaces, force-feedback systems, master arms for tele-operations and co-manipulation robots. The related field is that of automatons assigned to the tasks of manipulating objects in space.

More specifically, the invention relates to a man-machine control element used to impede or follow the movement of an operator, especially in order to stimulate his sensory system at a kinesthetic level.

The invention has numerous haptic applications, such as for example remote operation, support in re-education, human/robot co-manipulation during medical surgery or industrial operations, the interconnection of a human being with a virtual reality environment.

2. PRIOR ART

Robots working in collaboration with human beings are increasingly being used in numerous fields of application.

Such robots can be used for example in keyhole surgery which consists especially in making small-diameter holes in a patient's body in order to slide in surgical tools in order to carry out surgical operations.

In this case, as in that of other applications, the robot has for example an articulated arm rotationally mobile relative to a frame, if necessary along several axes, and motors capable of transmitting torques about these axes to the arm.

The arm is designed to carry a surgical instrument which will be moved by a surgeon during an operation. In order to stimulate the surgeon's haptic receptors during the operation so that he perceives the medium with which he is interacting during the operation, the robot is pre-programmed so that the motor or motors transmit drive torques or resistant torques to the arm, corresponding to the different areas (tissues, organs, nerves, etc.) of the medium in which the surgeon is acting. The motors thus make it possible to accompany (follow) or constrain (impede) the motions of the articulated arm and therefore those of the surgeon manipulating the arm. The surgeon thus receives force feedback during the operation, enabling him to sense the environment that he is manipulating to the best possible extent.

To fulfill its role, the robot must not only transmit torques to the articulated arm via the motors but also control the forces and stresses that are applied to it by its environment, for example an operator such as a surgeon, so as to adapt the torques that the motors transmit. The robot is therefore force-controlled.

In the prior art, there are different known ways of force-controlling a robot. These include a technique using a mechanically reversible robot using motor-driven joints. These robots make it possible to obtain an efficient estimation of the forces, at the motors, that are applied to the extremity of the robot. The robot is indeed designed in such a way that its joints do not undergo friction. Thus, the forces applied to the extremity of the robot are transmitted through transmission chains up to the motors. Since the current flowing in the motors is proportional to the torque that they generate, it is possible, by measuring the currents flowing in the motors, to estimate the forces applied to the robot and to control the robot accordingly.

To ensure a high level of reliability in the evaluation of the forces, the friction in the joints of the robot must be very low.

To this end, there are known ways of making direct-drive joints. However, for the joint to generate sufficient torques, the motors must be sized accordingly. They are then large in size, and this makes the robot less compact.

To use smaller-sized motors in order to improve the compactness of the robot, the torques delivered by the motors should be amplified (and their frequency of rotation should be reduced) by a reduction gear or reducer placed at the output of the motors. To this end, there are known ways of using cable reducers.

Cable reducers not only fulfill their primary reducer function efficiently but also have the advantage of not inducing any friction as would be the case for example with a gear reducer or a belt reducer. Indeed, a gear reducer would introduce friction between the teeth of the gearings. Besides, a slight pre-stress between the input and output shafts is generally used to minimize the transmission backlash. This pre-stress adds friction to the bearings and between the teeth in contact. A belt reducer too would introduce high friction. For the belt to work accurately, it must be tensed. This tension adds friction to the bearings of the input and output shafts. Besides, the belt applies friction to the pulleys when it reaches them and leaves them.

The document U.S. Pat. No. 5,046,375 describes an example of a cable reducer of the type comprising a pulley placed at the output of a motor, a pulley fixedly attached to the joint and a cable wound about the pulley fixedly attached to the motor in passing about the pulley fixedly attached to the joint. When the motor is put into rotation in one sense or the other, this rotationally drives the pulley fixedly attached to its shaft as well as the joint via the pulley fixedly joined to it and the cable.

Finally, there are known capstan-type cable reducers such as the one illustrated in FIG. 1.

This figure partially illustrates a motor-driven haptic interface articulated arm. This articulated arm has a frame 1 to which there is connected an arm 3 rotationally mobile about an axis 2 by means of a joint 4. The arm 3 can be rotationally driven about the axis 2 by means of a motor 5 and a capstan-type cable reducer 6.

This reducer 6 comprises:
- a pulley 61 of small diameter called a "motor pulley" linked to the output shaft 51 of a motor 5;
- a pulley or pulley portion of greater diameter 62 called a "sector" which is fixedly attached to the articulated arm 3, and the axis of rotation of which is identical to that of the arm;
- a cable 63, the extremities of which are linked to the sector 62, extending along the sector 62, and being wound about the motor pulley 61.

The reduction ratio is determined by the ratio of the sum of the radius of the motor pulley 61 and the radius of the cable on the one hand and the sum of the radius of the sector 62 and the radius of the cable on the other hand.

Putting the motor into rotation induces a rotation of the motor pulley 61. The sector 62, then rotationally driven by the cable 63 at a lower speed, in turn drives the articulated arm 3 rotationally about the axis 2 in transmitting a higher torque to the arm than the output torque from the motor 5.

Cable reducers and especially capstan-type cable reducers have the advantage of inducing very low friction. Indeed, the cable transmits forces tangentially to the axes of the pulleys. The guide bearings of the pulley are therefore not under load from the forces transmitted. The implementing of reducers of this type then efficiently provides for the reducer function and enables reliable measurement of the forces transmitted to the arm without the measurement being disturbed by high friction in the reducer. The evaluation of the forces is obtained by measuring the current passing through the motor, the value of which is proportional to the torque that it delivers.

The capacity of robots to apply force, i.e. their capacity to transmit drive torques force and resistant torques to the arm, respectively to guide or to constrain the user's movements is a major design criterion. Designers have therefore been constantly improving the capacity of the robots to exert force while trying to maintain their compactness. This compromise is obtained by working on the sizing of the motors and of the reduction ratio of the reducers.

For the choice of the motor drive, a designer would analyze the following aspects.

In the use of co-manipulated robots such as those listed above, it would seem that the need for resistant force capacity (the transmission of resistant torques) is far greater than the need for drive force capacity (the transmission of drive torques). Indeed, the guiding of the user's hand by the transmission of a drive torque to the arm is faithfully followed by the user. Conversely, the blocking of his hand by the transmission of a resistant torque to the arm goes against the user's intentions. The user therefore needs reaction time before he understands that the force felt is informing him about a prohibited area. During his reaction time, the user will tend to apply force on the arm against the force that is communicated to him by the motor.

The motors therefore need to be sized in such a way as to ensure that the maximum torques that they are capable of delivering are sufficient to suitably constrain the movement of a user's hand when it is sought to prevent him from having access to a given area so that this area is effectively not accessible to this user.

However, the amount of space occupied by the motors is substantially proportional to the maximum torque that they are capable of delivering. To optimize the compactness of motor-driven articulated arms therefore, the motors must generally be sized as accurately as possible.

In order to improve the compactness of a motor-driven arm, it can be planned to implement a brake to generate the resistant force needed to constrain the user's movements. Indeed, the application of a high-capacity brake makes it possible to back up the motor and reduce its size and thus optimize the space requirement of the robot while at the same time having a major resistant force available.

In this case, it would be tempting to size the motor in such a way as to generate the drive force needed to accompany the user's movements and to use a brake to generate the complementary resistant force to constrain the user's movements when necessary. However, when the brake is blocked, the motor does not run. It is therefore no longer possible to measure the electrical current passing through the motor, the value of this current, which is proportional to the torque that it delivers, making it possible to evaluate the forces to which the arm is subjected and to regulate the working of the motor or motors accordingly. Once the brake is blocked, it is therefore no longer possible to know the level of force applied to the arm by its environment. It is therefore difficult to determine the appropriate time at which to release the brake.

The definition of the brake controlling mode so that the brake assists the motor at the appropriate time without disturbing its use is therefore difficult. However, the controlling of the brake is essential inasmuch as wrong controlling of the brake would cause the operator to use the arm in a way that is not very natural or intuitive.

With regard to constraints of compactness, designers will also analyze the following aspects.

To carry out reliable transmission of motion from the pulley to the sector of the capstan-type reducer, steel cables are often used. The minimum winding radius of a cable on a pulley is given by the manufacturer of the cable. This minimum winding radius of the cable will therefore set the size of the motor pulley and therefore that of the sector. The most flexible steel cables currently accept winding radii equal to 16 times their radius.

Hence, to be able to improve the compactness of a robot, its designer will seek to reduce the radius of the motor pulley and therefore that of the cable. However, for a given type of cable, the mechanical resistance is proportional to its radius. Indeed, the greater the radius of the cable, the higher its mechanical resistance.

To improve compactness, it will therefore be sought to reduce the size of the steel cable to the utmost. However, this gives rise to the risk whereby if excessive force is exerted on the arm of the robot, the cable gets deformed. In extreme situations, this could lead to the breakage of the cable. The functioning of the robot would be disturbed with consequences that are harmful or acceptable in varying degrees depending on the nature of the task performed.

However, for sensitive applications, for example for medical applications, this type of drawback must be avoided. To this end, a major factor of security in terms of behavior or resistance under load is necessary. This factor of security dictates the use of large-diameter cables and therefore major space requirement for the reducer which adversely affects the overall compactness of the robot. This sizing must be done in correlation with the choice of the motor drive in order to obtain the requisite resistant force capacity.

Ultimately, the techniques of the prior art cannot be used to provide a robot which has optimized sizing in terms of
  resistant force and drive force capacity, and
  compactness,
and the operation of which will be transparent for the user, i.e. it will make it possible to accompany or constrain the operator's movement naturally and intuitively, i.e. without jerkiness.

There is therefore a need in this direction.

3. SUMMARY

An exemplary embodiment of the present disclosure proposes a motor-driven articulated haptic interface arm comprising at least:
  a frame;
  an arm linked to said frame so as to be rotationally mobile about at least one axis, forces being liable to be applied to said arm by its environment;
  motor means, comprising a rotor, designed to deliver at least one maximum resistant torque about said axis at least partly opposing said forces applied to said arm by its environment;
  a main transmission for transmitting said resistant torque generated by said motor means to said arm, said main transmission comprising a capstan cable reducer;
  means for evaluating said resistant torque transmitted to said arm by said motor means;
  means for braking the rotation of said arm about said axis;
  means for activating said means for braking when said maximum resistant torque is reached by said motor means;

means for evaluating, after activation of said means for braking, the forces transmitted to said arm by said environment, comprising means for determining at least one piece of information representing a deformation of said transmission under the effect of said forces;

means for deactivating said means for braking when said piece of information representing a deformation of said transmission goes below a predetermined threshold value.

Thus, the invention consists in fitting out a motor-driven articulated haptic interface arm comprising a main transmission with capstan-type cable reducer with:

a brake used to constrain the movement of the articulated arm when the motor no longer allows it, and means used for the evaluation, during a braking phase, of the forces applied to the arm by its environment in measuring the deformation of the main transmission due to these forces, the brake being released when these forces being braked pass below a pre-determined threshold value corresponding to the point where these forces reach a value low enough so that the resistant force required from the motor does exceed the maximum resistant torque that can be delivered by this motor.

It is thus possible to size the motor(s) as precisely as possible to optimize the resistant force capacity of the arm while at the same time ensuring a natural and intuitive use of the robot.

According to one characteristic that can be envisaged, said means for evaluating at least one piece of information representing a deformation of said transmission comprise means for evaluating the deformation of said cable.

The deformation of the cable gives a faithful and precise indication of the deformation of the transmission.

According to one characteristic that can be envisaged, said means for evaluating at least one piece of information representing a deformation of said transmission under the effect of said forces transmitted to said arm by its environment after activation of said means for braking comprise:

means for determining the angular position of said rotor about its axis of rotation;

means for estimating the theoretical angular position of said arm about its axis of rotation relative to said frame from said angular position of said rotor;

means for determining the real angular position of said arm about its axis of rotation relative to said frame;

means for determining the difference between said theoretical value and said real value of the angular position of said arm about its axis of rotation;

said means for deactivating being designed to deactivate said means for braking when said difference goes below said pre-determined threshold value.

The fact of determining the difference between the real position of the arm and its theoretical position makes it possible to obtain an estimation of the deformation of the transmission as well as of the forces communicated to the arm by its environment, thus making it possible to efficiently control the deactivation of the brake during a braking operation.

According to one characteristic that can be envisaged, said means for determining the real angular position of said arm about its axis of rotation relative to said frame comprise a sensor for sensing the angular position of said arm about its axis of rotation.

This provides a simple but precise and efficient way of determining the real angular position of the arm.

According to one characteristic that can be envisaged, said main transmission comprises:

a drive element rotationally linked to said arm, said drive element comprising at least one angular sector, the axis of which coincides with the axis of rotation of said arm;

a drive pulley linked to said motor means;

said cable of said cable reducer extending along said angular sector in being wound about said pulley, the extremities of said cable being fixed to said driving element.

According to one characteristic that can be envisaged, an arm according to the invention comprises an auxiliary transmission for transmitting said resistant torque to said arm, said auxiliary transmission being capable of taking at least two states:

an inactive state, taken so long as said forces applied to said arm by its environment against the effect of said torque are below a predetermined threshold, in which said auxiliary transmission transmits no torque to said arm;

an active state, taken when said forces applied to said arm by its environment against the effect of said torque are higher than a predetermined threshold, in which said main transmission transmits no torque to said arm.

An articulated haptic interface arm according to this variant is thus equipped with a main transmission with cable reducer and an auxiliary transmission having identical reduction ratios, the auxiliary transmission being implemented as a substitute for the main transmission with cable reducer when the forces applied to the arm by its environment become greater than a certain value.

The cable reducer can thus be sized as precisely as possible in order to optimize the compactness of the arm while at the same time ensuring a high mechanical worthiness or resistance, in other terms ensuring a high security factor when a force that is excessively high for the reducer is applied to the arm.

Implementing the invention thus procures an articulated haptic interface arm that is robust and compact, capable for example of finding application in sensitive fields such as especially the medical field.

According to one characteristic that can be envisaged, said auxiliary transmission is configured to take said active state when the forces applied by the environment to said arm against the effect of said resistant torque induce a deformation of said cable that is above a pre-determined threshold.

This threshold will be determined in such a way that the auxiliary transmission gets activated before the torque generated on the arm induces a deformation of the cable so as to cause it to deteriorate. Thus, the security and reliability of the arm according to the invention are guaranteed.

According to one characteristic that can be envisaged, said auxiliary transmission comprises:

a pinion linked to said motor means and mounted in the axis of the said pulley, at least one toothed-wheel portion fixedly attached to said drive element and meshing with said pinion;

the reduction ratio of said auxiliary transmission being identical to that of said main transmission, the center distance between the axis of rotation of said pinion and the axis of rotation of said toothed wheel being greater than the center distance between the axis of rotation of said pulley and the axis of rotation of said drive element in such a way that said pinion and said wheel are in contact and mesh with each other only when said auxiliary transmission is in said active state.

According to one characteristic that can be envisaged, said means for evaluating at least one piece of information representing a deformation of said transmission comprise means for detecting that said pinion has or has not come into contact with said wheel, said threshold value of the piece of information representing said deformation, which triggers the deactivation of said means for braking, being reached when said pinion and said wheel no longer come into contact while said means of activation activate said means for braking.

According to this variant, the pinions of the auxiliary transmission constitute a sensor making it possible to know the time at which, in the course of a braking operation, the forces applied by the environment to the arm are small enough so that the brake can then be released.

According to one characteristic that can be envisaged, said means for detecting that said pinion has come into contact with said wheel comprise said pinion and said toothed wheel which constitute an open electrical circuit so long as they are not in contact and a closed electrical circuit when they are in contact.

According to one characteristic that can be envisaged, the difference between said center distances ranges from 0.1 to 0.5 times the height of the teeth of said pinion and of said wheel.

A difference in center distance, i.e. a clearance between the pitch diameters of the pinion and of the wheels included within this interval gives a high level of security in ensuring the activation the auxiliary transmission before the cable gets deteriorated.

According to one characteristic that can be envisaged, the difference dE between said center distances is determined according to the following formula:

$$dE = C_{max}/(K \cdot \sin(alpha) \cdot F)$$

with alpha: angle of pressure of the gearing (pinion, wheel)
K: stiffness of cable
F: factor of security
Cmax: maximum load on the cable According to one characteristic that can be envisaged, said arm is mounted so as to be mobile in rotation relative to said frame along a plurality of axes, said articulated arm comprising as many sets of motor means, namely main transmission means, means for evaluating torque, braking means, activation means, means for evaluating at least one piece of information representing a deformation, means of deactivation and, as the case may be, auxiliary transmission means, as there are axes about which said arm can rotate, each set being dedicated to the transmission of torque along one of said axes.

An arm according to the invention can thus have several degrees of freedom.

The present invention also covers applications of the arm according to any one of the variants explained here above to a technical field belonging to the group comprising:
haptic interfacing with a virtual environment;
haptic interfacing with an augmented reality environment;
therapeutic re-education;
computer-assisted design;
tele-operation;
sports training;
training in technical gestures.

The present invention also covers a method for controlling a motor-driven articulated haptic interface arm comprising at least:
a frame;
an arm linked to said frame so as to be rotationally mobile about at least one axis, forces being liable to be applied to said arm by its environment;
motor means, comprising a rotor, designed to deliver a least one maximum resistant torque about said axis opposing at least in part said forces applied to said arm by its environment;
a main transmission for the transmission to said arm of said resistant torque generated by said motor means, said main transmission comprising at least one capstan cable reducer;
means for braking the rotation of said arm about said axis;
said method comprising:
a step for evaluating said resistant torque transmitted to said arm by said motor means;
a step for activating said means for braking when said maximum resistant torque is attained by said motor means;
a step of evaluation, after activation of said means for braking, of the forces transmitted to said arm by said environment, comprising a step for determining at least one piece of information representing a deformation of said main transmission under the effect of said forces;
a step for deactivating said means for braking when said piece of information representing a deformation of said main transmission goes below a predetermined threshold value.

According to one characteristic that can be envisaged, said step for evaluating at least one piece of information representing a deformation of said transmission under the effect of said forces transmitted to said arm by its environment after activation of said means for braking comprises:
a step for determining the angular position of said rotor about its axis of rotation;
a step for estimating the theoretical angular position of said arm about its axis of rotation relative to said frame from said angular position of said rotor;
a step for determining the real angular position of said arm about its axis of rotation relative to said frame;
a step for determining the difference between said theoretical value and said real value of the angular position of said arm about its axis of rotation;
said step for deactivating being implemented when said difference goes below said predetermined threshold value.

According to one characteristic that can be envisaged, said motor-driven articulated arm comprises an auxiliary transmission for transmitting said resistant torque to said arm, said auxiliary transmission being capable of taking at least two states:
an inactive state, taken so long as said forces applied to said arm by its environment against the effect of said torque are below a predetermined threshold, in which said auxiliary transmission transmits no torque to said arm;
an active state taken when said forces applied to said arm by its environment against the effect of said torque are higher than a predetermined threshold, in which said main transmission transmits no torque to said arm,
said auxiliary transmission comprising:
a pinion linked to said motor means and mounted in the axis of the said pulley,
at least one toothed-wheel portion fixedly attached to said drive element and meshing with said pinion;
the reduction ratio of said auxiliary transmission being identical to that of said main transmission,
the center distance between the axis of rotation of said pinion and the axis of rotation of said toothed wheel being greater than the center distance between the axis of rotation of said pulley and the axis of rotation of said drive element in such a way that said pinion and said wheel are in contact and mesh with each other only when said auxiliary transmission is in said active state;
said step of determination of at least one piece of information representing a deformation of said transmission comprising a step for detecting that said pinion has or has not come into contact with said wheel, said threshold value of the piece of information, representing said deformation that triggers the deactivation of said means for braking, being reached when said pinion and said wheel no longer come into contact while said means for braking are activated.

4. LIST OF FIGURES

Other features and advantages of the invention shall appear from the following description of particular embodiments, given by way of simple illustrative and non-exhaustive examples, and from the appended drawings, of which:

5. DESCRIPTION OF PARTICULAR EMBODIMENTS

5.1. Detection by Angular Shift

Figure 1:
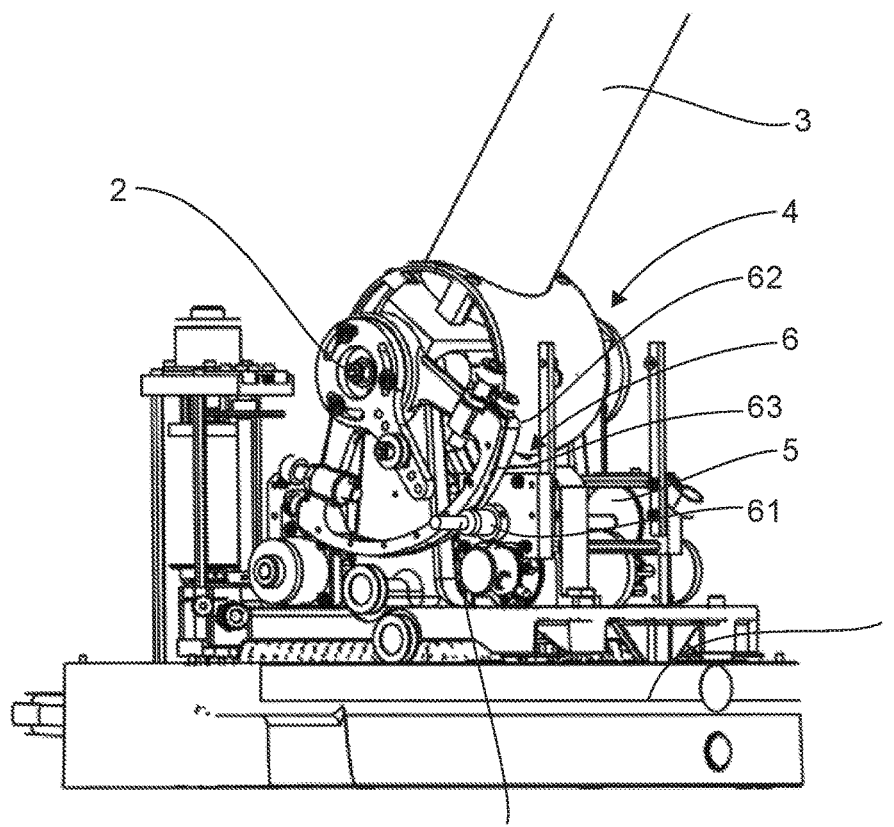
FIG. 1 illustrates a partial view in perspective of an articulated, haptic interface arm according to the prior art.
Figure 2:
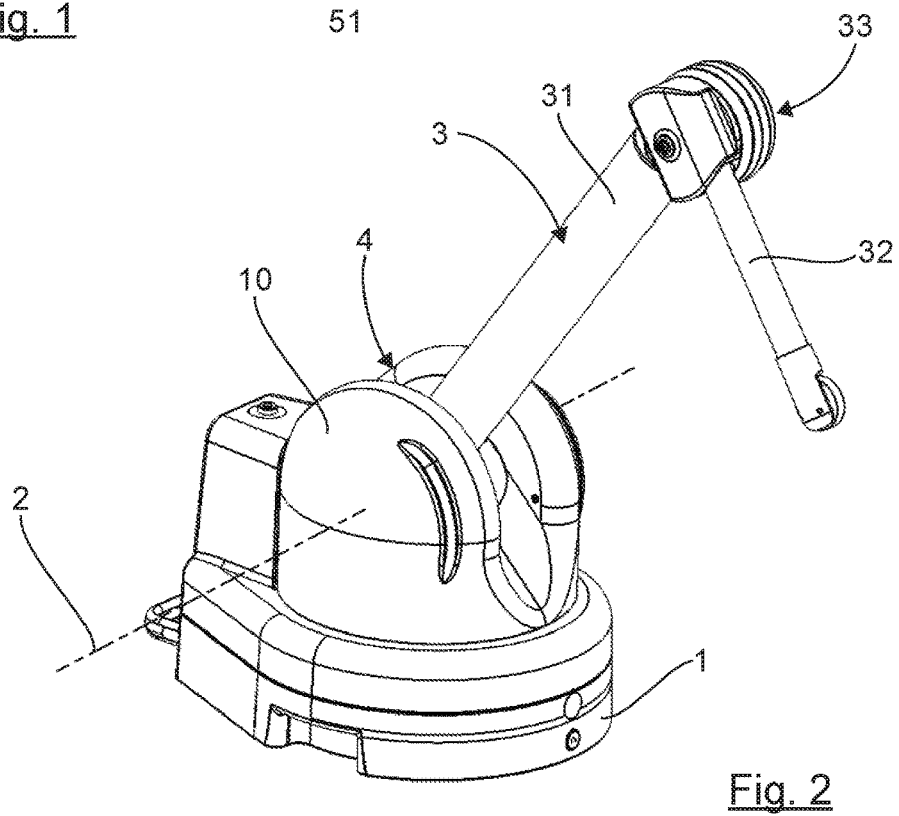
FIG. 2 illustrates a view in perspective of an articulated haptic interface arm according to the invention.
Figure 3:
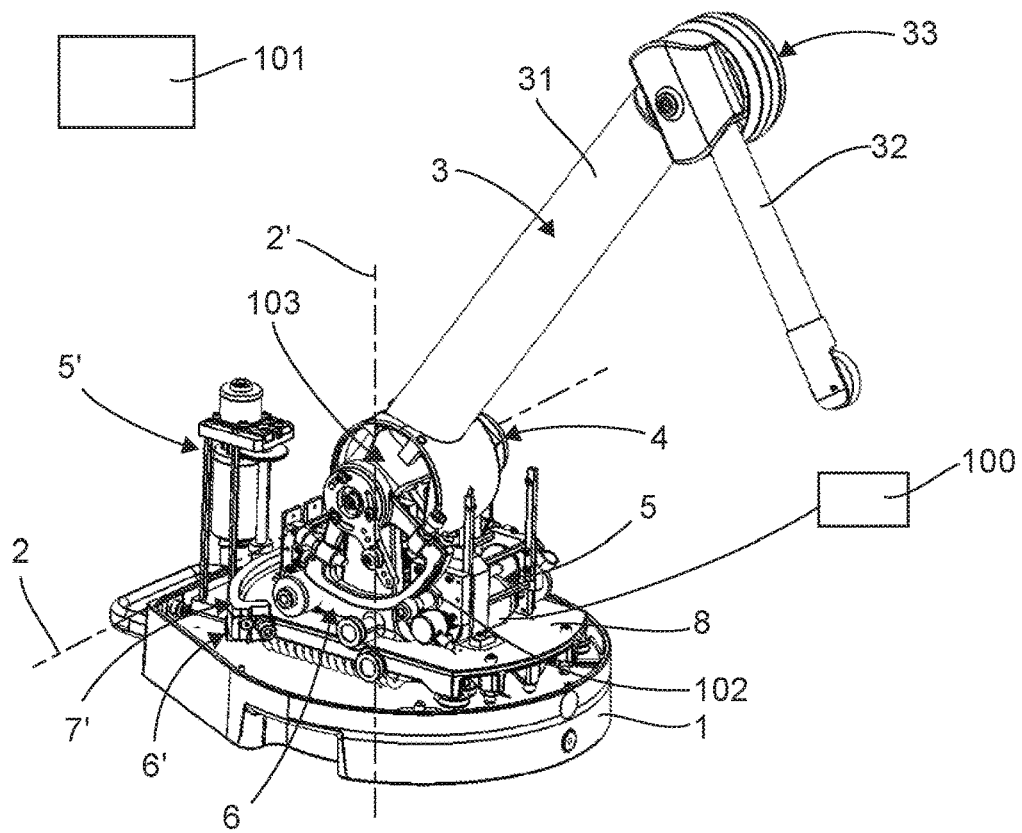
FIG. 3 illustrates the articulated arm of FIG. 2, the cover of which has been removed.
Figure 4:
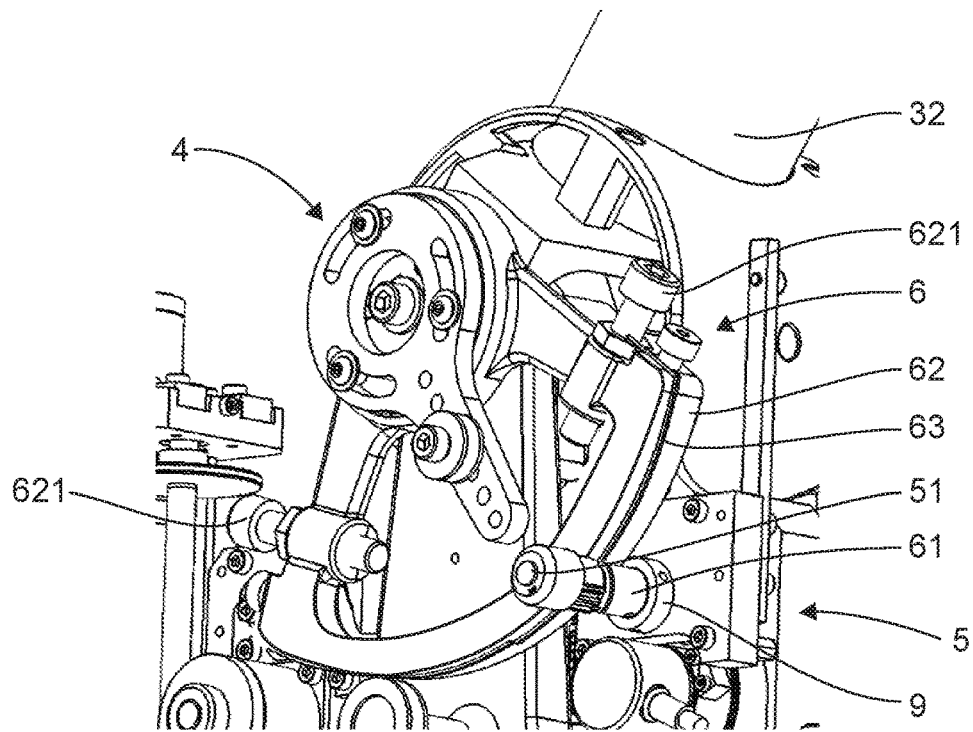
FIG. 4 illustrates a magnified view of the mechanism of transmission of the articulated arm of FIG. 3.
Figure 5:
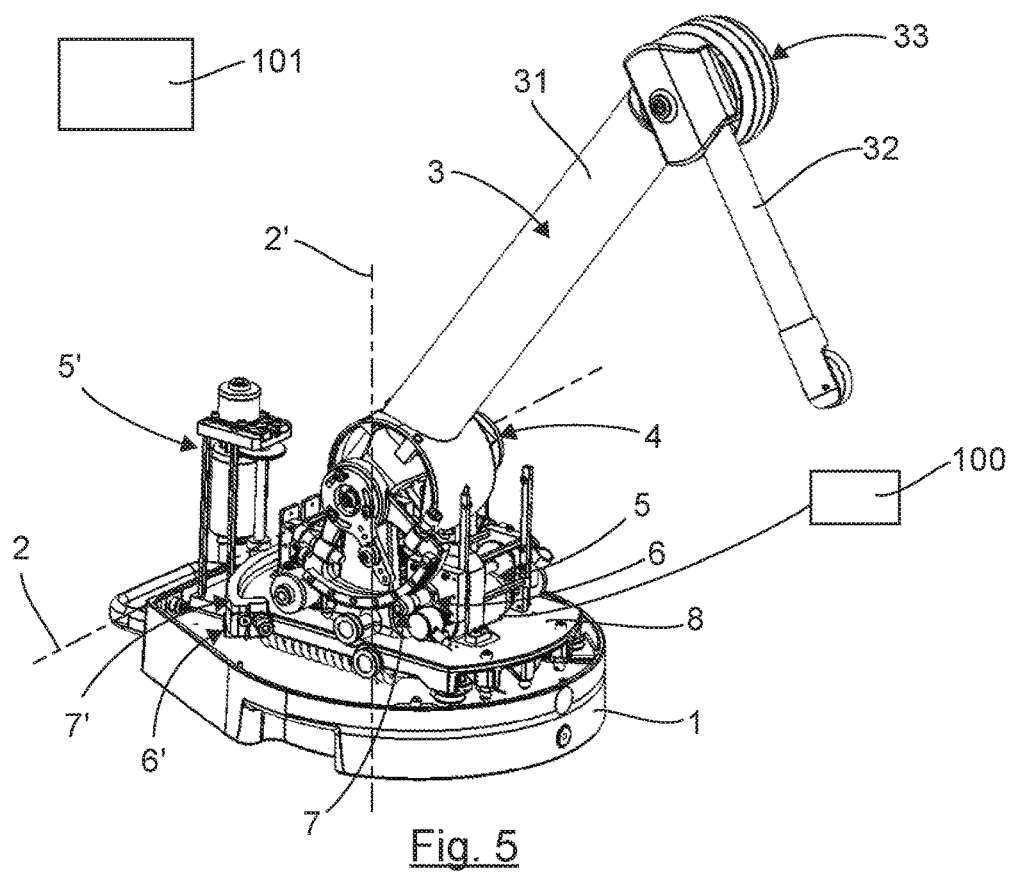
FIG. 5 illustrates a view in perspective or a three-quarter view of an articulated, haptic interface arm according to a second embodiment of the invention, the cap of which has been removed.
Figure 6:
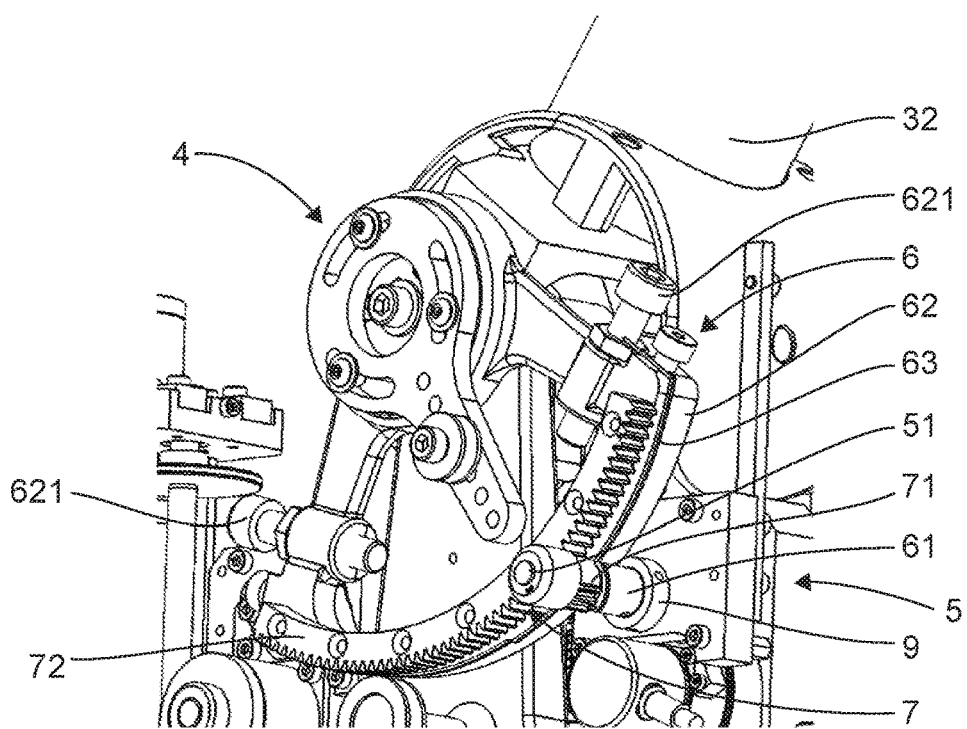
FIG. 6 illustrates a magnified partial view of the transmission mechanism of an articulated arm according to the second embodiment.
Figure 7:
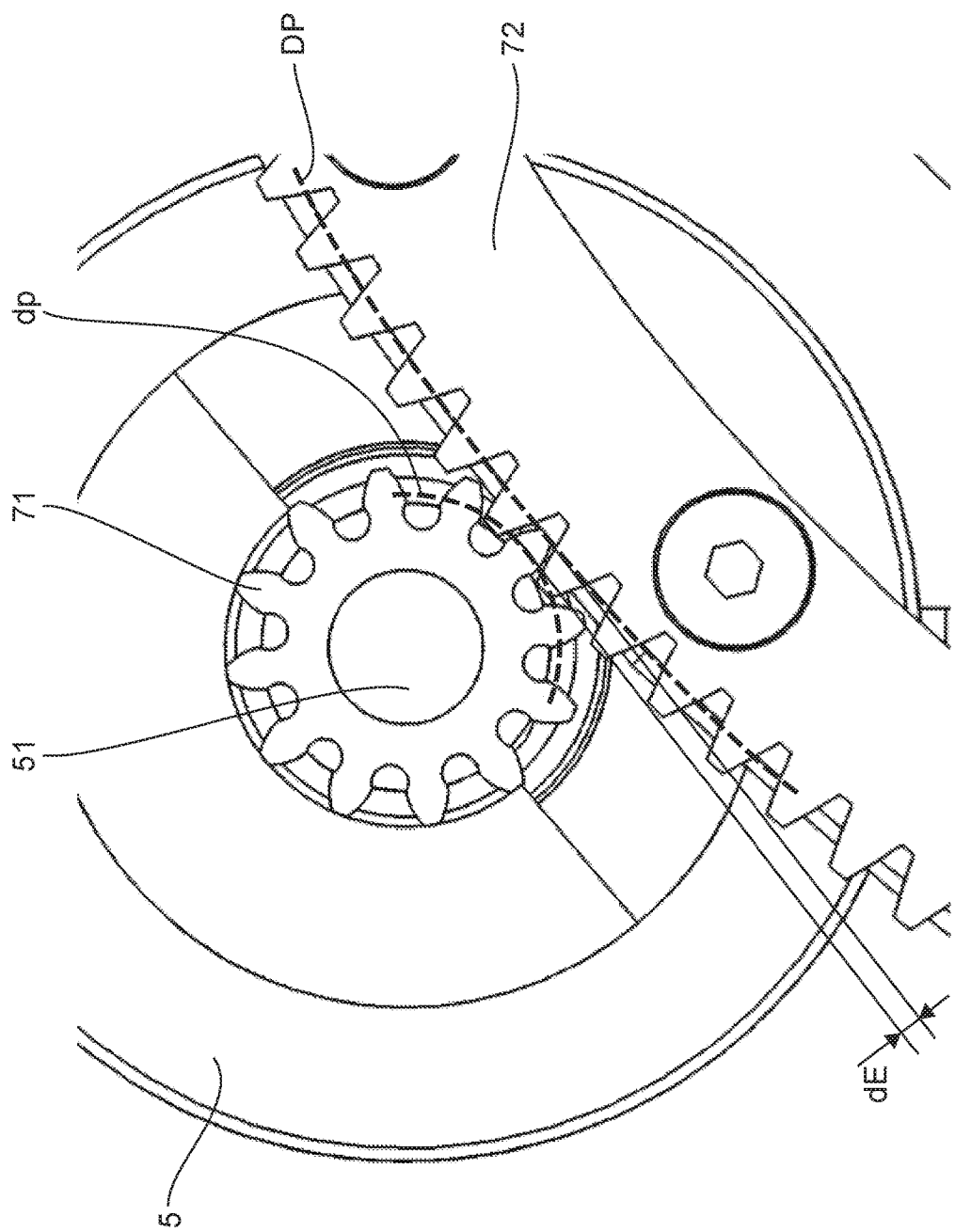
FIG. 7 illustrates a magnified partial view of the auxiliary transmission of the arm illustrated in FIG. 6.

Referring to FIGS. 2 to 4 and 8, we present an example of an embodiment of a motor-driven haptic interface articulated arm according to the invention.

As shown in these figures, such a motor-driven articulated arm comprises a frame 1 and an arm 3 fixedly attached to the frame 1 so as to be rotationally mobile about an axis 2 by means of a joint 4. The transmission mechanism of the articulated arm is covered with a cover 10.

The arm 3 is to be put into motion about the axis 2 by the external environment of the motor-driven articulated arm, such as for example an operator manipulating its extremity to carry out any unspecified task such as for example a surgical operation, an object-manipulating operation, etc.

In this embodiment, the arm 3 comprises two arm portions 31, 32 articulated with one another by means of a joint 33. The arm 3 could clearly take any shape whatsoever adapted to the application in view. It could for example comprise a single articulated portion or more than two articulated portions.

The articulated arm comprises a motor means capable of being implemented to transmit torques about the axis 2 to the arm 3. In this embodiment, these motor means comprise an electrical motor 5. The torques delivered by the motor could be sometimes drive torques and sometimes resistant torques depending on whether it is desired to accompany or constrain the motion of the arm.

As just indicated, the motor 5 is capable especially of delivering a resistant torque opposing the shifting of the arm around its rotation axis under the effect of forces communicated to it by its environment. The motor, by design, is not capable of delivering a resistant torque beyond a maximum resistant torque value. The motor classically comprises a stator and a rotor rotationally mobile relative to the stator.

The articulated arm comprises a main transmission 6 for the transmission to the arm 3 of a torque about the axis 2 generated by the motor 5 and opposing or not opposing the motion communicated to the arm by its environment.

In this embodiment, the main transmission 6 comprises a cable reducer, in particular of a capstan type.

This capstan-type cable reducer comprises classically a pulley 61 mounted so as to be fixedly attached in rotation to the output shaft 51 of the motor 5. It also has a pulley portion of greater diameter 52 also called a sector, fixedly attached in rotation to the arm 3 and having an axis of rotation that coincides with the axis 2. In one variant, the sector 2 could be replaced by a pulley. The reducer also has a cable 63. The free extremities of the cable are fixedly attached on either side of the sector 62 by means of screws 621 provided for this purpose. The cable 63 extends along the sector 62, more particularly the peripheral contour of this sector, in getting wound about the pulley 61.

According to the principle of operation of the capstan reducer, the distance between the axis of the pulley 61 and the axis of the sector 62 is greater than the sum of the following three quantities: the radius of the pulley 61, the sector 62 and the diameter of the cable 63. A gap of about 1 mm is often seen. This prevents the cable from rubbing simultaneously against the pulley and the sector.

The articulated arm comprises means for evaluating the resistant torque transmitted to the arm 3 by the motor 5. These means for evaluating comprise means 100 for measuring the electrical power supply current consumed by the motor, the value of which represents the torque that it delivers. These means for measuring conventionally comprise electronic control circuitry which measures the current flowing in the motor while making it pass through a calibrated resistor. The measurement of the voltage at the terminals of this resistor gives an view of the current in the motor. The value of the torque delivered by the motor is governed by the following relationship:

$$C = Kt * I$$

C: Torque delivered by the motor
Kt: Drive torque constant
I: Current flowing in the motor The articulated arm comprises means 9 for braking the rotation of the arm 3 about its rotational axis 2. These braking means could for example comprise a magnetic brake known to those skilled in the art such as brakes commercially distributed by the company KEB. They could alternatively comprise any other type of brake that can be remotely controlled.

For example, such a brake could especially comprise a rotor and a stator, permanent magnets and a coil. When the brake is not powered with electrical current, the permanent magnets produce a magnetic field which generates a major coupling force between the rotor and the stator mutually inducing a braking torque. When the coil of the brake is powered with electrical current, the magnetic field is neutralized. The rotor and the stator then separate without any residual torque because of a spring leaf, so much so that no braking torque is applied.

The articulated arm comprises means for activating braking means when the evaluated resistant torque reaches the maximum resistant torque that can be delivered by the motor 5.

The braking level could be regulated by controlling the current and therefore the magnetic field in the coil of the brake. A regulation mechanism could limit the current flowing in the brake and thus limit the increase in temperature of the brake. The current could be controlled by means of a current regulator as a motor.

The articulated arm comprises means for deactivating the braking means.

The articulated arm also comprises means of evaluation enabling the evaluation, after the braking means have been activated, of the forces transmitted to the arm 3 by its environment. These means for evaluating comprise means for determining at least one piece of information representing a deformation of the main transmission under the effect of the forces transmitted to the arm by its environment, especially the torque about its axis of rotation 2.

More particularly, according to ties embodiment, the information in question represents the deformation of the cable. Indeed, the deformation of the cable which constitutes a deformation of the main transmission is proportional to the forces applied to the arm by its environment.

The means for evaluating at least one piece of information representing a deformation of the main transmission under the effect of the forces transmitted to the arm by its environment after activation of the braking means comprise, in this embodiment:

means for determining the angular position of the rotor of the motor 5 about its axis of rotation: these means for determining could include an angle sensor or again an encoder 102 used to find out the angular position of the rotor relative to the stator;

means for estimating the theoretical angular position of the arm about its axis of rotation relative to the frame from the angular position of the rotor: in this embodiment, these are means for computing the theoretical angular position, this position being equal to the following product: the angular position of the rotor of the motor multiplied by reduction ratio of the main transmission;

means for estimating the theoretical angular position of the arm about its axis of rotation relative to the frame from the angular position of the rotor: in this embodiment, these are means for computing the theoretical angular position, this theoretical angular position being equal to the product of the angular position of the rotor of the motor by the reduction ratio of the main transmission;

means for determining the real angular position of the arm about its axis of rotation relative to the frame: these means for determining could comprise an angle sensor 103 used to know the real angular position of the arm relative to the frame;

means for determining the difference between the theoretical value and the real value of the angular position of the arm about its axis of rotation.

In this embodiment, the means for deactivating the brake are designed to deactivate the brake when the difference between the theoretical value and the real value of the angular position of the arm about its axis of rotation goes below a predetermined threshold value, which corresponds to the point at which the piece of information representing the deformation of the main transmission reaches the threshold value below which the means for deactivating are implemented to deactivate the brake. This threshold value is determined in such a way that the point at which it is reached corresponds to the point at which the forces transmitted to the arm by its environment reach a level such that the motor again becomes capable of opposing these forces without the assistance of the brake.

The arm comprises a central processing unit 101 programmed to regulate the working of the brake and to perform all the measurements and computations needed to implement this regulation.

Figure 8:
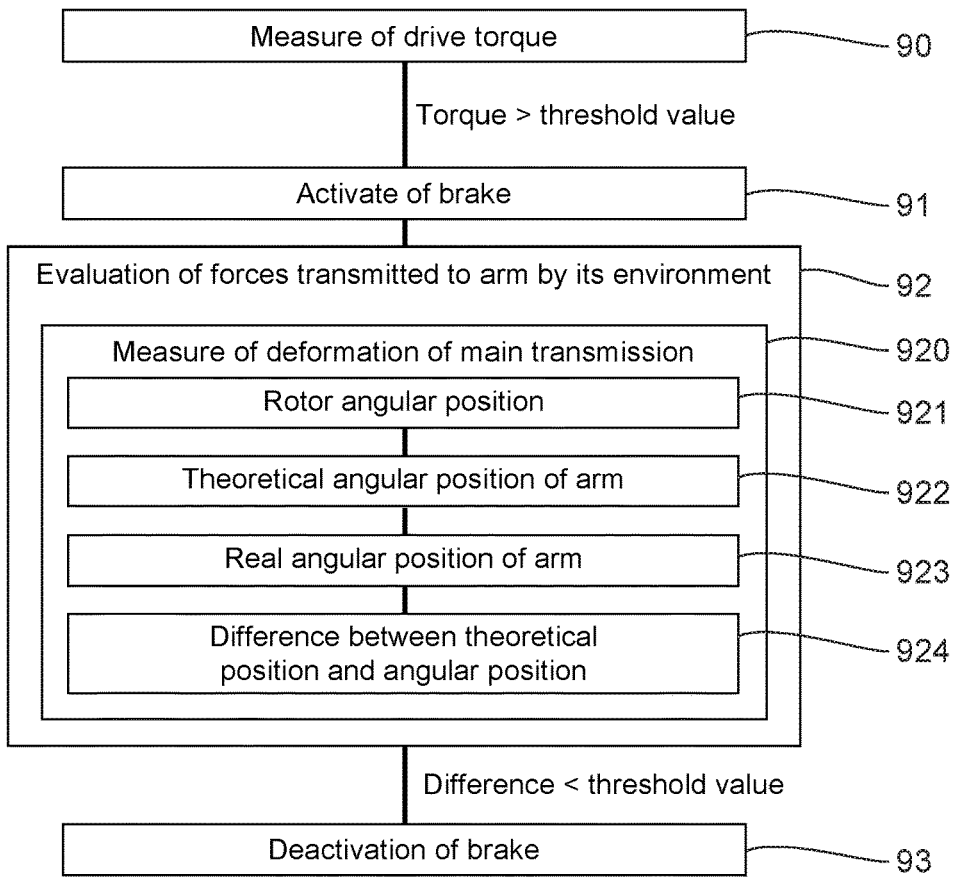
FIGS. 8 and 9 illustrate the logic diagrams of the methods for regulating the brake according to the first and second embodiments.

According to this embodiment and referring to FIG. 8, the braking is regulated as follows.

A step 90 for measuring the resistant torque delivered by the motor is implemented continuously. This step comprises the measurement of the power supply current of the motor and the computation of the torque delivered by the motor from the value of its power supply current according to the following relationship:

$$C = Kt * I$$

C: Torque delivered by the motor
Kt: Drive torque constant
I: Current flowing in the motor The value of the torque thus evaluated is compared with the maximum value of the resistant torque that can be delivered by the motor. When the value measured reaches the maximum permissible value, then the means for activating carry out a step 91 for activating the brake during which they command the activation of the brake. The motor, which is no longer capable by itself of opposing the forces applied to the arm by its environment to constrain the movement of the arm solely through the resistant torque that it delivers, is then assisted by the brake to achieve this goal. It is thus ensured that the movement of the arm is properly constrained whenever this is required.

While the brake is activated, it is no longer possible to know the value of the forces applied to the arm by its environment from the value of the power supply current of the motor, since this arm is being assisted by the brake in such a way that the value of this current is no longer directly proportional to these forces.

A step 92 for evaluating the forces transmitted to the arm by its environment is then carried out. This step consists of the measurement of at least one piece of information representing the deformation of the main transmission, which as it happens is a piece of information representing the deformation of the cable. During this step 920, the following are implemented:

a step 921 for determining the angular position of the rotor about its rotational axis through the angle sensor or encoder 102 provided for this purpose on the motor;

a step 922 for estimating the theoretical angular position of the arm about its axis of rotation relative to the frame from the angular position of the rotor: to this end, the position of the rotor of the motor is multiplied by the reduction ratio to obtain an estimate of the theoretical position of the arm;

a step 923 for determining the real angular position of the arm about its axis of rotation relative to the frame through the angle sensor 103 provided for this purpose at the arm;

a step 924 for determining the difference between the theoretical value and the real value of the angular position of the arm about its axis of rotation.

The means for deactivating then carry out a step 93 for deactivating the brake when the difference between the theoretical value and the real value of the angular position of the arm about its axis of rotation becomes smaller than a predetermined threshold value. This threshold value is determined experimentally in such a way that reaching this threshold value corresponds to the point at which the forces transmitted to the arm by its environment reach a level such that the motor again becomes capable of opposing these forces without the assistance of the brake.

For example, if the theoretical angular position is equal to 10° and if the real angular position is equal to 18°, then the arm has pivoted by 8° under the effect of the deformation of the cable. If it is considered that, below a pivoting of the arm by 4° under the effect of the deformation of the cable, the motor is again capable of putting the shifting of the arm under constraint without the assistance of the brake, then the brake will be deactivated when the real angular position of the arm is 14°.

Naturally, the operation of the arm has been described here only by emphasizing the phases during which the motor transmits resistant torques to constrain the shifting of the arm. During this operation, the motor can also transmit drive torques during phases when it is desired to accompany the shifting of the arm. The robotic arm is conventionally programmed for this purpose and controlled in this sense by the central processing unit. In particular, the forces applied by the motors are computed by the central processing unit in order to prohibit the user from taking action in certain areas.

5.2. Detection by Activation of an Auxiliary Transmission

Referring to FIGS. 5 to 7 and 9, we present a second embodiment of a motor-driven articulated arm according to the invention.

An arm according to this second embodiment is identical to the one according to the first embodiment except with regard to the means for evaluating at least one piece of information representing a deformation of the main transmission which are different from those described with reference to the first embodiment and except for the fact that it includes an auxiliary transmission.

This auxiliary transmission 7 transmits torques about the axis 2 to the arm. These torques are generated by the motor and counter or do not counter the motion communicated to the arm 3 by its environment.

This auxiliary transmission comprises a pinion 71 mounted so as to be fixedly attached in rotation to the output shaft 51 of the motor 5 in the extension of the pulley 63. It also has a toothed wheel portion 72 fixedly attached to the sector 62 and concentric with it. Its teeth form protrusions in the peripheral surface of the sector. In one variant, the toothed wheel portion could be replaced by a complete toothed wheel, especially when the sector is replaced by a pulley. The toothed wheel portion 72 is designed to mesh with the pinion 71. The pinion 71 and the toothed wheel 72 constitute a gear reducer.

The reduction ratio of the cable reducer of the main transmission is equal to that of the gear reducer of the auxiliary transmission. To this end, the pitch diameter of the pinion 71 is equal to the sum of the diameter of the pulley 61 and the diameter of the cable 63, and the pitch diameter of the toothed wheel portion 72 is equal to the sum of the diameter of the sector 62 and the diameter of the cable 63.

The auxiliary transmission 7 can take at least two states:
an inactive state taken so long as the forces applied by the environment on the arm 3 against the effect of the torque generated by the motor 5 are below a predetermined threshold; in this state the auxiliary transmission transmits no torque to the arm; it is inactive;
an active state, taken when the forces applied by the environment on the arm 3 against the effect of the resistant torque generated by the motor 5 are above the predetermined threshold; in this state, the main transmission transmits no torque to the arm (it is inactive), the torque being transmitted to the arm only via the auxiliary transmission.

To this end, the center distance between the pinion 71 and the toothed wheel portion 72 is slightly increased as compared with the center distance between the pulley 61 and the sector 62. The pitch diameter DP of the pinion 71 is therefore neither secant or tangential with the pitch diameter DP of the toothed wheel portion 72. These pitch diameters are on the contrary slightly distant from each other. Thus, in the inactive state, there is a clearance between the teeth of the pinion and the teeth of the toothed wheel.

The adjusting of this center difference could for example be obtained by mounting the motor on a support that can be shifted on a range of settings relative to the frame and kept in position after adjustment.

Thus, so long as the level of load applied by the environment to the arm is below a certain value, the pinion 71 is not in contact with the wheel portion 72. The transmission of torque to the arm 3 is then done by the main transmission 6 including the capstan reducer and not by the auxiliary transmission which is then in an inactive state.

If a major force is exerted on the arm by its environment, the cable 63 stretches without breaking until the teeth of the pinion 73 and of the toothed wheel portion 72 come into contact. The mechanical behavior or resistance of the joint is then ensured by the gearing system of the auxiliary transmission. The torque is then transmitted to the arm by the auxiliary transmission with gear reducer which is in an inactive state and no longer by the main transmission with cable reducer.

The clearance between the teeth of the gear reducer in the inactive state and the stiffness of the cable determine the limit level of force needed to pass from operation in cable-reducer mode to operation in gear-reducer mode This clearance will preferably range from 0.1 to 0.5 times the height of the teeth of the gearings. It will obviously be determined in such a way that the cable does not break before and during the phases when the auxiliary transmission becomes active. The elongation of the cable inducing the passage of the auxiliary transmission from its inactive state to its active state will preferably take place under elastic deformation.

This clearance between the pitch diameters of the pinion and the wheel, which is equal to the difference dE between, on the one hand, the center distance between the axis of rotation of the pinion 71 and the axis of rotation of the toothed wheel portion 72 and, on the other hand, the center distance between the axis of rotation of the pulley 61 and the axis of the rotation of the sector 62 can be determined for example as follows:

$$dE = C\text{max}/(K \cdot \sin(\text{alpha}) \cdot F)$$

with alpha: angle of pressure of the gearing (pinion, wheel)
K: stiffness of cable
F: safety factor
Cmax: maximum load on the cable.

The application of the auxiliary transmission therefore gives transparency and fluidity to the cable reducer so long as the forces on the arm remain low, and gives high mechanical resistance to the gear reducer when the load on the arm increases.

Thus, it is possible to choose a small-sized cable and thus improve the compactness of the joint while ensuring its mechanical worthiness.

According to the second embodiment, the difference dE between the center distances is chosen in such a way that when the resistant torque delivered by the motor reaches its maximum value and is no longer sufficient to counter the forces applied to the arm by its environment, the pinion 71 and the wheel 73 come into contact with each other. This coming into contact results from the deformation of the main transmission, more particularly from the lengthening of the cable, under the effect of the forces applied to the arm by its environment.

The means for evaluating at least one piece of information representing a deformation of the main transmission comprise means for detecting whether or not the pinion 71 comes into contact with the wheel 72.

The means for detecting the coming into contact of the pinion with the wheel comprise the pinion and the toothed wheel made with conductive material. These constitute an open electrical circuit so long as they are not in contact and a closed electrical circuit when they are in contact.

The deactivation of the braking means is then done when, during a braking phase, the pinion and the wheel no longer come into contact. This corresponds to the point at which the piece of information representing the deformation of the main transmission reaches the threshold value below which the means for deactivating are implemented to deactivate the brake. This corresponds to the point at which the forces applied to the arm by its environment reach a value low enough so that the resistant torque required from the motor does not exceed the maximum resistant torque that can be delivered by this motor.

Figure 9:
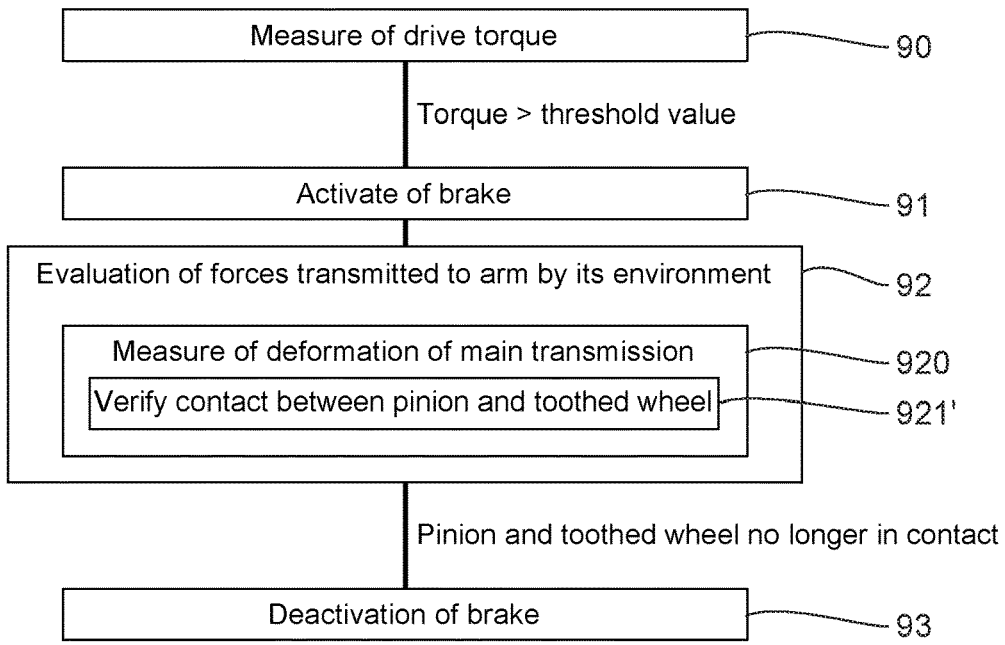

According to this embodiment, the regulation of the braking is done as follows with reference to FIG. 9.

A step 90 for evaluating the resistant torque delivered by the motor is implemented continuously. The step comprises the measurement of the power supply current for the motor and the computation of the torque as a function of this measurement expressed according to the following relationship:

$$C = Kt*I$$

C: Torque delivered by the motor
Kt: Drive torque constant
I: Current flowing in the motor The value of the torque thus evaluated is compared with the maximum value of resistant torque that can be delivered by the motor. When the value measured reaches the maximum value permissible, then the activation means carry out a step 91 for activating the brake during which they command the activation of the brake.

The attaining of the maximum resistant torque that can be delivered by the motor corresponds to the instant at which the pinion 71 and the wheel 72 come into contact.

Thus, according to one variant, rather than evaluating the resistant torque given by the motor by measuring its power supply, and comparing the value measured with the maximum value in order to activate or not activate the brake, the brake could be triggered when, during a non-braking phase, the pinion and the wheel come into contact. The corresponding technical means could then be applied for this purpose.

While the brake is activated, a step 92 for evaluating the forces transmitted to the arm by its environment is implemented. In this case, it is the torque transmitted by its environment to the arm about its axis of rotation. This step consists in measuring at least one piece of information representing the deformation of the main transmission which, as it happens, is a piece of information representing the deformation of the cable. During this step 920, at a step 921', the instant is detected at which the pinion and the wheel are no longer in contact during the braking operation, i.e the instant when the circuit that they form opens. This instant corresponds to the point at which the threshold value of deformation of the main transmission below which the brake can be deactivated is reached, the motor then being capable of opposing the forces transmitted to the arm by its environment to constrain its movement in delivering a sufficient resistant torque. Thus, during a braking operation, the pinion and the wheel are no longer in contact, and the means for deactivating carry out a step 93 for deactivating the brake.

Naturally, the operation of the brake has been described here only by emphasizing the phases during which the motor transmits resistant torques to constrain the movement of the arm. During this operation, the motor can also transmit drive torques during phases when it is sought to accompany the movement of the arm. The robotic arm is conventionally programmed for this purpose and controlled by the central processing unit. In particular, the forces applied by the motors are computed by the central processing unit to prohibit the user from taking action in certain areas.

5.3. Variants

In one variant, the device according to the first embodiment could comprise an auxiliary transmission.

It may be recalled that the invention can be applied to a device for putting a haptic interface into a state of mobility.

By way of an indication, such a device for putting a haptic interface into mobility can be implemented for the re-education of a patient's arm or, again, for co-manipulation during a surgical operation.

Naturally, the various possible embodiments of the device according to the invention that can be envisaged are numerous.

In other particular embodiments, it can be envisaged, without departing from the framework of the invention, to implement a simple haptic interface intended for example for applications of tele-operation, video games, virtual reality, computer-assisted design, sports training, or training in technical gestures. According to another application that can be envisaged, it can be planned to integrate a device for putting a tool-changer into motion, for which the object to be moved or manipulated is an articulated clamp. According to another application that can be envisaged, a maneuvering element such as a manipulating robot would advantageously incorporate a device according to the invention.

In variants of the invention, one or more intermediate reducers could be implemented between the output of the motor and the shaft on which the motor pulley is mounted.

For reasons of mechanical balance, a main transmission/auxiliary transmission pair could be implemented on either side of the joint connecting the arm to the frame.

In the embodiment described above, the arm is mobile in rotation relative to the frame along a single axis. In variants, it could be mobile in rotation relative to the frame along several axes. In this case, the motor-driven articulated arm will comprise a number of sets or pairs of sets of motor means, main transmission, torque evaluation means, braking means, activation means, means for evaluating at least one piece of information representing a deformation, means of deactivation, and if necessary, auxiliary transmission means equivalent to the number of axes about which the arm can rotate, each set being dedicated to the transmission of torque along one of said axes.

The arm could for example be mobile in rotation relative to the frame along a first axis 2 and along a second axis 2' orthogonal to the first axis, a first set or pair of sets of motor means 5, main transmission means 6, and if necessary auxiliary transmission means 7 being dedicated to the transmission of torque along the first axis 2 and a second set or pair of sets of motor means 5', main transmission means 6' and if necessary auxiliary transmission means 7' being dedicated to the transmission of torque along the second axis 2'. As many means as needed will also be implemented to regulate the brakes of the different motors.

For example, if the arm 3 is mobile in rotation about two different axes 2 and 2', the set constituted by the mobile arm 3 along the first axis 2, the main transmission 6 and if necessary the auxiliary transmission 7 and the motor 5 could be mounted on a plate 8 rotationally mobile relative to the frame 2 along another axis 2'. The motor-driven arm could then include another motor 5' as well as a main transmission 6' and if necessary another auxiliary transmission 7' to drive the plate 8 rotationally along this other axis 2' according to the same principle as the one by which the torque of the motor 5 is transmitted to the arm 3 along the first axis 2.

The arm 3 could naturally be rotationally mobile relative to the frame 2 along more than two axes.

An exemplary embodiment of the present disclosure provides an efficient solution to at least some of the different problems of the prior art.

At least one embodiment, provides an articulated haptic interface arm with a cable reducer having high capacity in terms of force, especially resistant force.

At least one embodiment improves the resistant force capacity of such an articulated arm while at the same time ensuring natural operation of the device.

At least one embodiment provides an articulated arm that is compact.

At least one embodiment provides an articulated arm that is simple in design and/or easy to implement.

Although the present disclosure has been described with reference to one or more examples, workers skilled in the art will recognize that changes may be made in form and detail without departing from the scope of the disclosure and/or the appended claims.

The invention claimed is:

1. A motor-driven articulated haptic interface arm comprising at least:
    a frame;
    an arm linked to said frame so as to be rotationally mobile about at least one axis, forces being liable to be applied to said arm by its environment;
    a motor comprising a rotor, designed to deliver at least one resistant torque, up to a maximum value, about said axis opposing at least one part of said forces applied to said arm by said environment;
    a main transmission for transmission to said arm of said resistant torque generated by said motor about said axis, said main transmission comprising a capstan-type cable reducer;
    a brake, which brakes rotation of said arm about said axis;
    control circuitry, which is configured to:
    evaluate said resistant torque transmitted to said arm by said motor;
    activate said break when said resistant torque delivered by said motor reaches said maximum value;
    evaluate, after activation of said break, the forces transmitted to said arm by said environment, and determine at least one piece of information representing a deformation of said main transmission under the effect of said forces; and
    deactivate said break when said piece of information representing said deformation of said main transmission goes below a predetermined threshold value.

2. The motor-driven articulated haptic interface arm according to claim 1, wherein said control circuitry is configured to determine the at least one piece of information representing said deformation of said main transmission by evaluating said deformation of a cable of said capstan-type cable reducer.

3. The motor-driven articulated haptic interface arm according to claim 1, wherein said control circuitry for determining at least one piece of information representing said deformation of said main transmission under the effect of said forces transmitted to said arm by said environment after activation of said break comprises:
    means for determining an angular position of said rotor about its axis of rotation;
    means for estimating a theoretical angular position of said arm about its axis of rotation relative to said frame taking into consideration said angular position of said rotor;
    means for determining a real angular position of said arm about its axis of rotation relative to said frame;
    means for determining a difference between said theoretical value and said real value of angular position of said arm about its axis of rotation;
said means for deactivating being designed to deactivate said break when said difference goes below said predetermined threshold value.

4. The motor-driven articulated haptic interface arm according to claim 3, wherein said means for determining said real angular position of said arm about its axis of rotation relative to said frame comprise a sensor for sensing said angular position of said arm about its axis of rotation.

5. The motor-driven articulated haptic interface arm according to claim 1, wherein said main transmission comprises:
    a drive element rotationally linked to said arm, said drive element comprising at least one angular sector, which has an axis that coincides with said axis of rotation of said arm;
    a drive pulley linked to said motor;
    a cable of said capstan-type cable reducer extending along said angular sector in getting wound about said pulley, wherein extremities of said cable are fixed to said drive element.

6. The motor-driven articulated haptic interface arm according to claim 1, comprising an auxiliary transmission for transmission of said resistant torque to said arm, said auxiliary transmission being capable of taking at least two states:
    an inactive state, taken so long as said forces applied to said arm by said environment against the effect of said resistant torque are below a predetermined threshold, in which said auxiliary transmission transmits no resistant torque to said arm;
    an active state taken when said forces applied to said arm by said environment against the effect of said resistant torque are higher than a predetermined threshold, in which said main transmission transmits no resistant torque to said arm.

7. The motor-driven articulated haptic interface arm according to claim 6 wherein said auxiliary transmission is configured to take said active state when the forces applied by said environment to said arm against the effect of said resistant torque induce that said deformation of a cable of said capstan-type cable reducer is above a predetermined threshold.

8. The motor-driven articulated haptic interface arm according to claim 7,
wherein said main transmission comprises:
a drive element rotationally linked to said arm, said drive element comprising at least one angular sector, which has an axis that coincides with said axis of rotation of said arm;
a drive pulley linked to said motor;
a cable of said capstan-type cable reducer extending along said angular sector in getting wound about said pulley, wherein extremities of said cable are fixed to said drive element; and
wherein said auxiliary transmission comprises:
a pinion linked to said motor and mounted along an axis of said pulley,
at least one toothed-wheel portion fixedly attached to said drive element and meshing with said pinion;
said auxiliary transmission having a reduction ratio being identical to that of said main transmission,
the axis of rotation of said pinion and the axis of rotation of said toothed-wheel portion having a center distance, the axis of rotation of said pulley and the axis of rotation of said drive element having a center distance, said center distance between said axis of rotation of said pinion and said axis of rotation of said toothed-wheel portion being greater than said center distance between said axis of rotation of said pulley and said axis of rotation of said drive element in such a way that said pinion and said toothed-wheel portion are in contact and mesh with each other only when said auxiliary transmission is in said active state.

9. The motor-driven articulated haptic interface arm according to claim 8, wherein said control circuitry for determining at least one piece of information representing said deformation of said main transmission comprise means for detecting that said pinion has or has not come into contact with said toothed-wheel portion, said threshold value of said piece of information representing said deformation, which triggers the deactivation of said break, being reached when said pinion and said toothed-wheel portion no longer come into contact while said control circuitry activates said break.

10. The motor-driven articulated haptic interface arm according to claim 9, wherein said means for detecting that said pinion has or has not come into contact with said toothed-wheel portion comprise said pinion and said toothed-wheel portion which constitute an open electrical circuit so long as they are not in contact and a closed electrical circuit when they are in contact.

11. The motor-driven articulated haptic interface arm according to claim 8, wherein the difference between said center distances ranges from 0.1 to 0.5 times the height of teeth of said pinion and of said toothed-wheel portion.

12. The motor-driven articulated haptic interface arm according to claim 8, wherein the difference dE between said center distances is determined according to the following formula:

$$dE = C_{max}/(K \cdot \sin(\text{alpha}) \cdot F)$$

with alpha: angle of pressure of said pinion and said toothed-wheel portion
K: stiffness of said cable of said capstan-type cable reducer
F: factor of security
Cmax: maximum load on said cable of said capstan-type cable reducer.

13. The motor-driven articulated haptic interface arm according to claim 1 wherein said arm is mounted so as to be rotationally mobile relative to said frame along a plurality of axes, said motor-driven articulated haptic interface arm comprising as many sets of motors, main transmissions, breaks, and control circuitry for evaluating said resistant torque, activating the brake, determining at least one piece of information representing said deformation, and deactivating the brake as there are axes around which said arm can rotate, each set being dedicated to the transmission of resistant torque along one of said axes.

14. The motor-driven articulated haptic interface arm according to claim 1, wherein said arm is applied to a technical field belonging to the group consisting of:
haptic interfacing with a virtual environment;
haptic interfacing with an augmented reality environment;
therapeutic re-education;
computer-assisted design;
tele-operation;
sports training;
training in technical gestures.

15. A method for controlling a motor-driven articulated haptic interface arm comprising at least:
a frame;
an arm linked to said frame so as to be rotationally mobile about at least one axis, forces being liable to be applied to said arm by its environment;
a motor, comprising a rotor, designed to deliver a least one resistant torque, up to a maximum value, about said axis opposing at least in part said forces applied to said arm by said environment;
a main transmission for transmission to said arm of said resistant torque generated by said motor, said main transmission comprising at least one capstan-type cable reducer;
a break, which brakes rotation of said arm about said axis;
said method comprising the following acts performed by control circuitry:
evaluating said resistant torque transmitted to said arm by said motor;
activating said break when said resistant torque delivered by said motor reaches said maximum value;
evaluating, after activation of said break, of the forces transmitted to said arm by said environment, comprising determining at least one piece of information representing a deformation of said main transmission under the effect of said forces;
deactivating said break when said piece of information representing said deformation of said main transmission goes below a predetermined threshold value.

16. The method for controlling said motor-driven articulated haptic interface arm according to claim 15, wherein said evaluating at least one piece of information representing said deformation of said main transmission under the effect of said forces transmitted to said arm by said environment after activation of said break comprises:

determining an angular position of said rotor about its axis of rotation;

estimating a theoretical angular position of said arm about its axis of rotation relative to said frame taking into consideration said angular position of said rotor;

determining a real angular position of said arm about its axis of rotation relative to said frame;

determining a difference between said theoretical value and said real value of said angular position of said arm about its axis of rotation;

and wherein said deactivating is implemented when said difference goes below said predetermined threshold value.

17. The method for controlling said motor-driven articulated haptic interface arm according to claim 15, wherein said main transmission comprises:

a drive element rotationally linked to said arm, said drive element comprising at least one angular sector, which has an axis that coincides with said axis of rotation of said arm;

a drive pulley linked to said motor;

a cable of said capstan-type cable reducer extending along said angular sector in getting wound about said pulley, wherein extremities of said cable are fixed to said drive element, said motor-driven articulated haptic interface arm comprising an auxiliary transmission for transmitting said resistant torque to said arm, said auxiliary transmission being capable of taking at least two states:

an inactive state, taken so long as said forces applied to said arm by said environment against the effect of said resistant torque are below a predetermined threshold, in which said auxiliary transmission transmits no resistant torque to said arm;

an active state taken when said forces applied to said arm by said environment against the effect of said resistant torque are higher than a predetermined threshold, in which said main transmission transmits no resistant torque to said arm;

said auxiliary transmission comprising:

a pinion linked to said motor and mounted along an axis of said pulley, at least one toothed-wheel portion fixedly attached to said drive element and meshing with said pinion;

said auxiliary transmission having a reduction ratio being identical to that of said main transmission, the axis of rotation of said pinion and the axis of rotation of said toothed-wheel portion having a center distance, the axis of rotation of said pulley and the axis of rotation of said drive element having a center distance, said center distance between said axis of rotation of said pinion and said axis of rotation of said toothed-wheel portion being greater than said center distance between said axis of rotation of said pulley and said axis of rotation of said drive element in such a way that said pinion and said toothed-wheel portion are in contact and mesh with each other only when said auxiliary transmission is in said active state;

said determination of at least one piece of information representing said deformation of said main transmission comprising detecting that said pinion has or has not come into contact with said toothed-wheel portion, said threshold value of said piece of information, representing said deformation that triggers said deactivation of said break, being reached when said pinion and said toothed-wheel portion no longer come into contact while said brake is activated.

* * * * *